(12) United States Patent
Wang (10) Patent No.: US 11,971,126 B2
(45) Date of Patent: Apr. 30, 2024

(54) SINGLE-HANDEDLY OPERATED INFLATABLE AIR NOZZLE CONNECTOR

(71) Applicant: BETO ENGINEERING & MARKETING CO., LTD., Taichung (TW)

(72) Inventor: Lopin Wang, Taichung (TW)

(73) Assignee: BETO ENGINEERING & MARKETING CO., LTD., Taichung (TW)

( * ) Notice: Subject to any disclaimer, the term of this patent is extended or adjusted under 35 U.S.C. 154(b) by 278 days.

(21) Appl. No.: 17/553,457

(22) Filed: Dec. 16, 2021

(65) Prior Publication Data

US 2023/0137312 A1    May 4, 2023

(30) Foreign Application Priority Data

Oct. 29, 2021   (TW) .................................. 110140210

(51) Int. Cl.
*F16L 37/138*    (2006.01)
*F16L 37/133*    (2006.01)
*B60S 5/04*    (2006.01)

(52) U.S. Cl.
CPC ........... *F16L 37/138* (2013.01); *F16L 37/133* (2013.01); *B60S 5/04* (2013.01)

(58) Field of Classification Search
CPC ....... F16L 37/12; F16L 37/138; F16L 37/133; F16L 37/122; F16L 37/127; F16L 37/16; F16L 37/084; F16L 37/0847; F16L 37/098

See application file for complete search history.

(56) References Cited

U.S. PATENT DOCUMENTS

| | | | | |
|---|---|---|---|---|
| 5,740,835 A | * | 4/1998 | Murphy | F16L 37/138 251/149.6 |
| 10,393,301 B1 | * | 8/2019 | Danielson | F16L 37/0985 |
| 2016/0258563 A1 | * | 9/2016 | Danielson | F16L 37/0847 |

FOREIGN PATENT DOCUMENTS

| | | |
|---|---|---|
| CN | 203770722 U | 8/2014 |
| DE | 102009048929 A1 | 4/2011 |
| TW | M585854 | 11/2019 |

* cited by examiner

*Primary Examiner* — Aaron M Dunwoody
(74) *Attorney, Agent, or Firm* — Guice Patents PLLC (57) ABSTRACT

An inflatable air nozzle connector comprises a clamping component, an airtight ring and a shell sleeve, the airtight ring is disposed in the clamping component; the shell sleeve is capable of slidably sleeving on an outer periphery of the clamping component and displacing between a pressing position and a releasing position. When the shell sleeve displaces downward to the pressing position, the clamping component is pressed, so that clamping jaws of the clamping component compress the airtight ring; when the shell sleeve displaces upward to the releasing position, the clamping jaws are not pressed, and the clamping jaws do not compress the airtight ring. When a user pushes or pulls the shell sleeve single-handedly, the inflatable air nozzle connector is capable of airtightly sleeving on an air nozzle of a tire, or separating from the air nozzle of the tire, making operation of inflating tire more convenient.

13 Claims, 9 Drawing Sheets

SINGLE-HANDEDLY OPERATED INFLATABLE AIR NOZZLE CONNECTOR

BACKGROUND OF THE INVENTION

Field of Invention

The invention relates to an inflator for bicycles, and more particularly to an inflatable air nozzle connector connected to an inflator to inflate a tire.

Related Art

One way to inflate the tire of a bicycle is to inflate with an inflator. The inflator connects to the air nozzle of the tire through an inflation connector, and air is injected into the tire through the inflator.

Taiwan utility model patent No. M585854 discloses an inflator connector for use with an inflator. As shown in FIG. 10 of M585854, a clamping structure 20 and an airtight component 30a are provided in an air nozzle body 10a. The airtight component 30a comprises a sealing washer 31a and a clamping washer 32a; a sliding sleeve 40a can be axially movably sleeved on the clamping structure 20, and a connecting member 13a of the nozzle body 10a is connected to the inflator.

When inflating a tire, as shown in FIG. 11 of the above utility model patent, the air nozzle body 10a of the inflator connector is sleeved on an air nozzle 50 of a tire. Then, the user pushes the sliding sleeve 40a to slide downward with one hand to make the sliding sleeve 40a press clamping plates 22 of the clamping structure 20, causing the clamping plates 22 to contract inward and compress the clamping washer 32a, so that the clamping washer 32a airtightly sleeves on the tire air nozzle 50, thereby the inflator can inject air into the tire from the tire air nozzle 50.

After inflation is completed, the user has to hold the air nozzle body 10a with one hand, and push the sliding sleeve 40a upward with another hand, so that the sliding sleeve 40a no longer presses the clamping plates 22 of the clamping structure 20. The clamping plates 22 are stretched outwardly, and the clamping washer 32a is no longer compressed, so that the inflator connector can be separated from the air nozzle 50 of the tire.

The inflator connector of the above patent must be operated with two hands during inflation operation, that is, holding the air nozzle body 10a with one hand and pushing the sliding sleeve 40a to displace upward and downward with the other hand, and therefore the operation is not convenient.

SUMMARY OF THE INVENTION

The invention aims to solve the above-mentioned drawbacks, and its main object is to provide an inflatable air nozzle connector for use with an inflator, and the inflatable air nozzle connector can be conveniently operated by a user single-handedly.

The inflatable air nozzle connector that can be operated single-handedly provided by the invention comprises:
  a clamping component having an air passage; a plurality of clamping jaws are disposed around a bottom end of the clamping component, an annular chamber is formed between the clamping jaws and communicates with the air passage; the clamping jaws are capable of closing inwardly or stretching outwardly;
  an airtight ring installed in the chamber of the clamping component, the airtight ring has a through hole communicating with the air passage; and
  a shell sleeve having a hollow sleeve body, a bottom end of the sleeve body is an open end, and a top end of the sleeve body is a closed end; an accommodating space is formed in the sleeve body; a connector portion is disposed on the closed end of the sleeve body, a perforation of the connector portion communicates with the accommodating space of the shell sleeve;
  the sleeve body of the shell sleeve is sleeved on an outer periphery of the clamping component and capable of displacing relative to the clamping component, when the shell sleeve displaces downward to a pressing position, the clamping jaws of the clamping component are pressed to close inwardly, so that the clamping jaws compress the airtight ring; when the shell sleeve displaces upward to a releasing position, the clamping jaws are not pressed, and the clamping jaws stretch outwardly to stop compressing the airtight ring.

Thereby, when a user pushes or pulls the shell sleeve single-handedly, the inflatable air nozzle connector is capable of airtightly sleeving on an air nozzle of a tire, or separating from the air nozzle of the tire, making operation of inflating tire more convenient and fast.

In one preferred implementation, an inner peripheral surface of the sleeve body is provided with a snap portion; an outer peripheral surface of the clamping component is provided with a fasten portion, when the shell sleeve is located at the releasing position, the snap portion contacts the fasten portion, and when in the releasing position, the clamping component does not press the clamping jaws. By means of a contact relationship between the snap portion and the fasten portion, when the shell sleeve moves in a direction away from the open end, the clamping component is driven to move together. Therefore, the user can easily separate the inflatable air nozzle connector from the air nozzle of the tire by pulling the shell sleeve with the sleeve body or the connector portion.

In one preferred implementation, the air passage passes through a top end and the bottom end of the clamping component.

In one preferred implementation, a main body of the clamping component is provided with an air hole passing through a bottom end of the main body; at least one flow channel is radially provided in the main body and communicates with the air hole, at least one end of the flow channel passes through a peripheral surface of the main body and communicates with the accommodating space; the air hole and the at least one flow channel form the air passage.

In the above-mentioned implementation, the peripheral surface of the main body is recessed with an annular air groove; at least one end of the flow channel communicates with the air groove, so that air flows from the air groove into the flow channel and flows into the air hole of the main body.

In the above-mentioned implementation, a top surface of the main body is provided with at least one guide groove, and at least one end of the guide groove communicates with the air groove.

In one preferred implementation, the shell sleeve is composed of the sleeve body and an end member, the end member is disposed at one end of the sleeve body to form the closed end; and the connector portion and the perforation are disposed on the end member.

In one preferred implementation, the clamping component is composed of a main body and a connecting member, a top end of the connecting member is connected to the main body; the air passage is disposed in the main body; and the clamping jaws are disposed around a bottom end of the connecting member.

In one preferred implementation, the inner peripheral surface of the sleeve body is provided with a snap portion; the outer peripheral surface of a bottom side of the clamping component is provided with a positioning portion, and when the shell sleeve is located at the pressing position, the snap portion contacts the positioning portion.

BRIEF DESCRIPTION OF THE DRAWINGS

The objects, features, and achieved efficacies of the invention can be understood from the description and drawings of the following preferred embodiments, in which.

DETAILED DESCRIPTION OF THE INVENTION

Please refer to FIGS. 1 to 4 for an inflatable air nozzle connector 10 provided by a first preferred embodiment of the invention, which is connected to an inflator to inflate a tire with the inflator. The inflator can be a manually operated device or a powered device. The inflatable air nozzle connector 10 comprises a clamping component 20, an airtight ring 40 and a shell sleeve 50.

Figure 1:
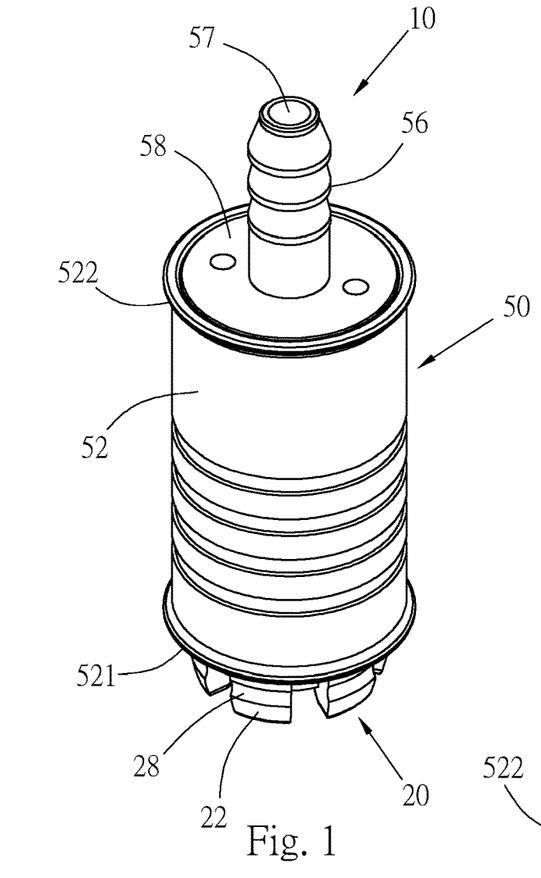
FIG. 1 is a top perspective view of an inflatable air nozzle connector of a first preferred embodiment of the invention.
Figure 2:
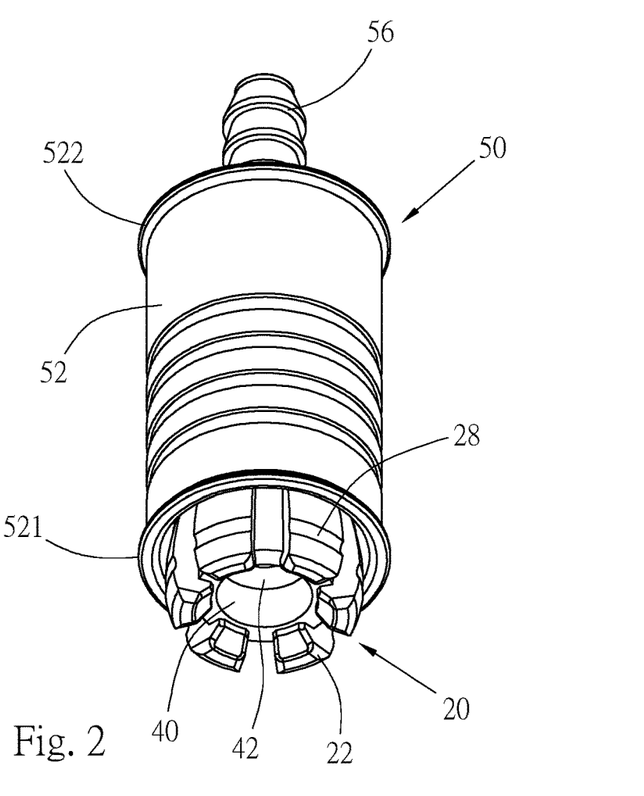
FIG. 2 is a bottom perspective view of the inflatable air nozzle connector of the first preferred embodiment of the invention.
Figure 3:
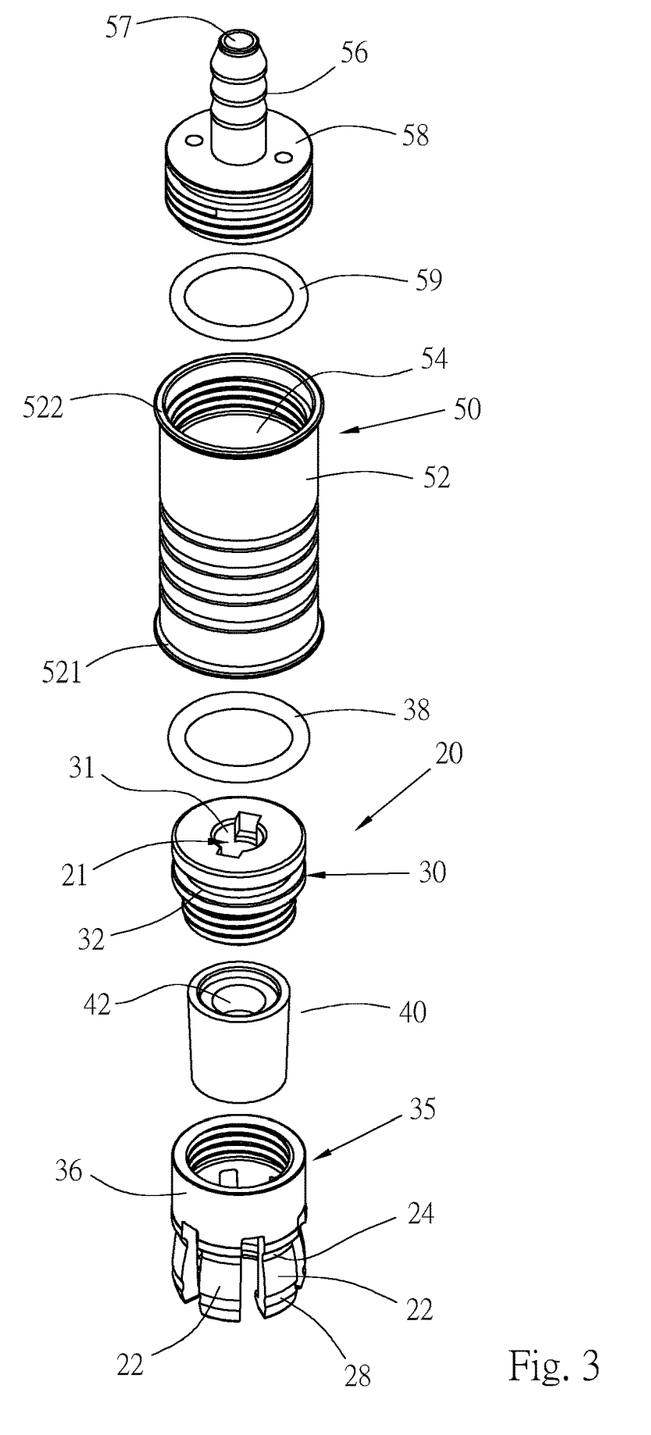
FIG. 3 is an exploded perspective view of FIG. 1.
Figure 4:
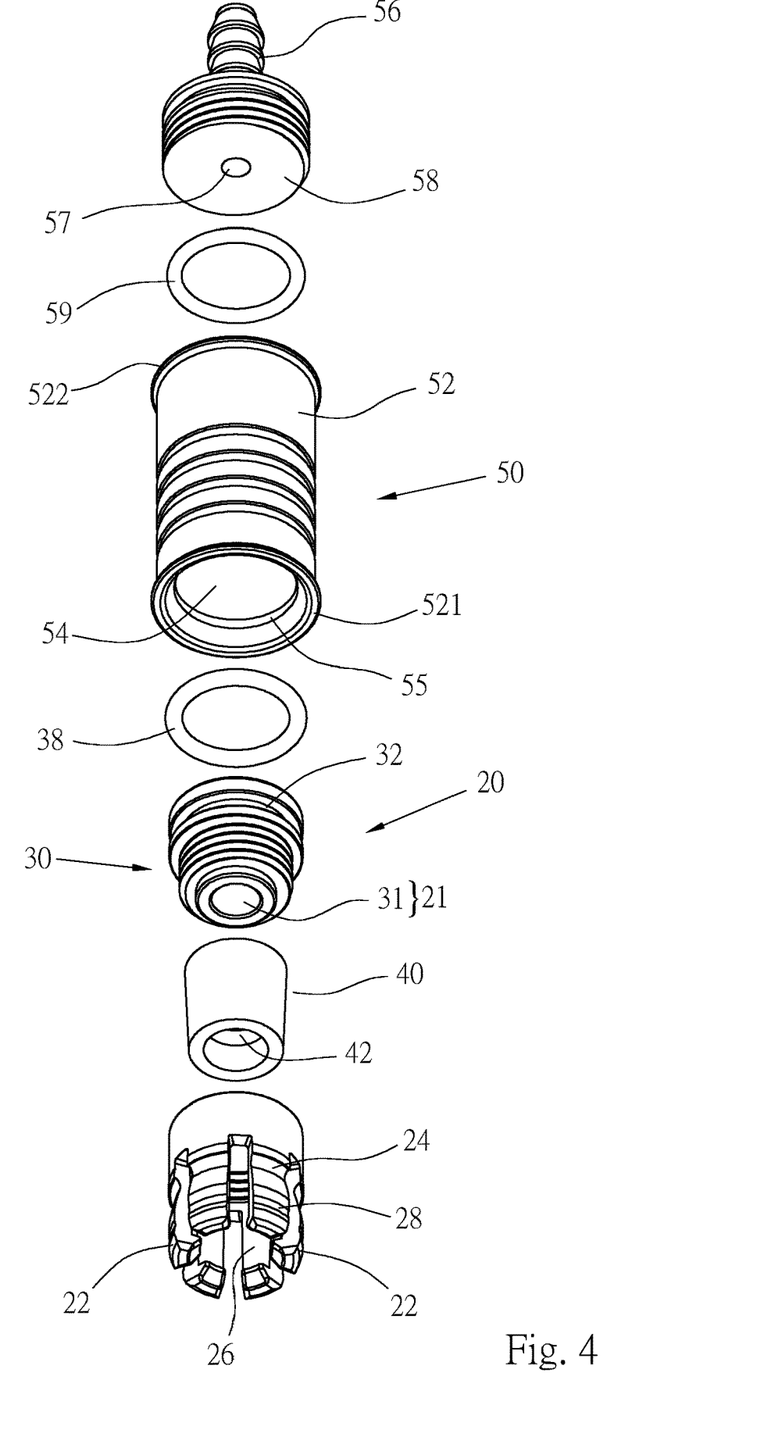
FIG. 4 is an exploded perspective view of FIG. 2.
Figure 5:
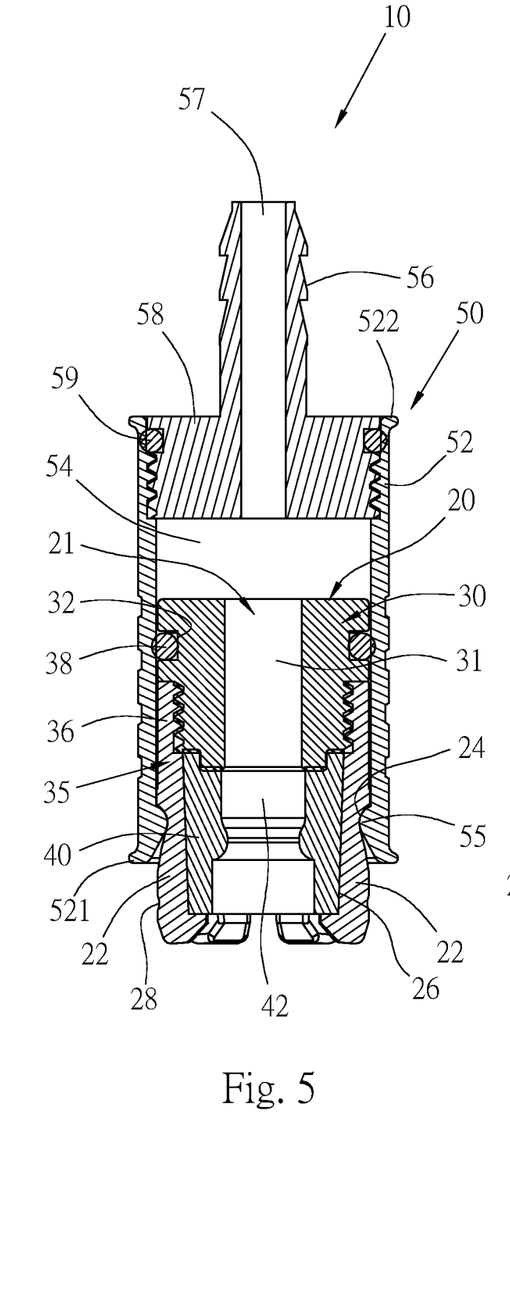
FIG. 5 is a cross-sectional view of the inflatable air nozzle connector of FIG. 1 in the top-bottom direction.

Please refer to FIG. 5 in conjunction with FIGS. 1 to 4. The clamping component 20 has a top end and a bottom end, and a direction from the top end to the bottom end is an axial direction thereof; an air passage 21 disposed in the clamping component 20 and passing through the top and bottom ends of the clamping component 20 along the axial direction of the clamping component 20, so that air is capable of flowing through the clamping component 20; a plurality of clamping jaws 22 disposed around the bottom end of the clamping component 20 in the form of a circle, and the clamping jaws 22 have swingable elasticity, and thus are capable of closing inwardly or stretching outwardly in a radial direction of the clamping component 20. An outer peripheral surface of a top side of each of the clamping jaws 22 is recessed inwardly to form a fasten portion 24. The outer peripheral surface of each of the clamping jaws 22 is a convex surface that gradually protrudes downward from the fasten portion 24. Therefore, a diameter formed by the top side of the outer peripheral surface of each of the clamping jaws 22 is smaller than a diameter formed by a bottom side of the outer peripheral surface of each of the clamping jaws 22. An annular chamber 26 is formed between the clamping jaws 22 and communicates with the air passage 21.

The clamping component 20 can be a one-piece component. In this preferred embodiment, a main body 30 and a connecting member 35 are assembled to form the clamping component 20, the main body 30 is a hollow cylindrical member, and an air hole 31 inside thereof constitutes a part of the air passage 21. The connecting member 35 has a cylindrical portion 36, and the clamping jaws 22 are disposed on a bottom end of the cylindrical portion 36. The cylindrical portion 36 is screwed to a bottom end of the main body 30, so that the connecting member 35 and the main body 30 are connected to form the clamping component 20.

The airtight ring 40 is installed in the chamber 26 of the clamping component 20, and is made of rubber material and can be deformed by force. A through hole 42 provided in a center of the airtight ring 40 communicates with the air passage 21. A bottom end of the airtight ring 40 is supported by the clamping jaws 22 and will not fall out of the chamber 26.

The shell sleeve 50 has a hollow sleeve body 52, a bottom end 521 of the sleeve body 52 is an open end, a top end 522 of the sleeve body 52 is a closed end, an accommodating space 54 is formed in the sleeve body 52; and an annular snap portion 55 is provided on an inner peripheral surface of the sleeve body 52. A connector portion 56 has a penetrated perforation 57, the connector portion 56 is disposed on the closed end (the top end 522) of the sleeve body 52, and the perforation 57 communicates with the accommodating space 54 of the shell sleeve 50.

The shell sleeve 50 of this preferred embodiment is composed of the sleeve body 52 and a round end member 58. The top end 522 of the sleeve body 52 is screwed to an outer periphery of the end member 58, so that the top end 522 of the sleeve body 52 forms the closed end 522, and airtightness between peripheral surfaces of the sleeve body 52 and the end member 58 is kept by a leak-proof element (O-ring) 59. The connector portion 56 and the perforation 57 are disposed on the end member 58.

Figure 7:
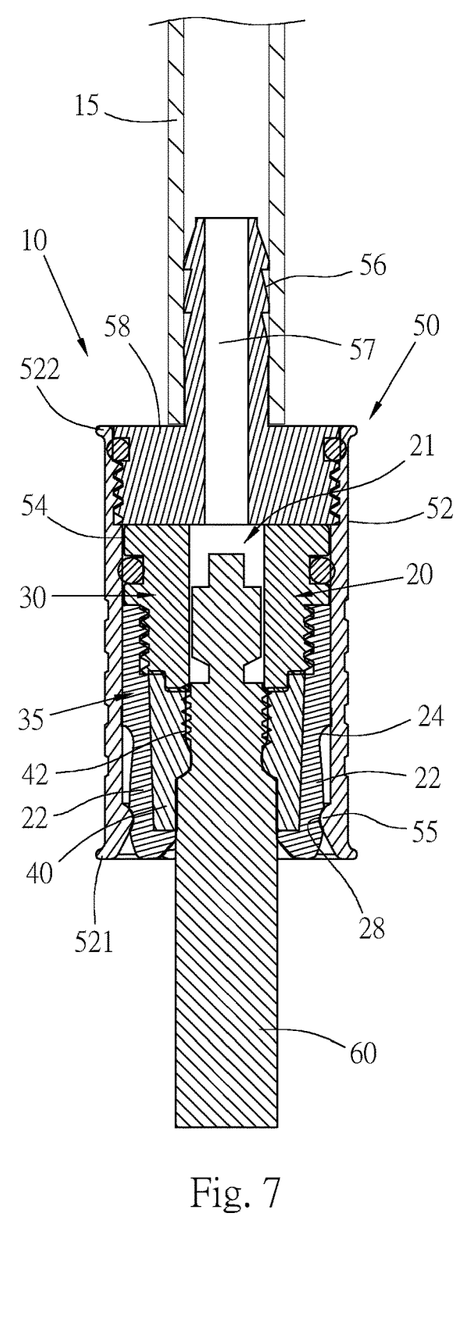

The shell sleeve 50 is capable of slidably sleeving on an outer periphery of the clamping component 20 with the sleeve body 52, and is capable of sliding downward to a pressing position (as shown in FIG. 7) and sliding upward to a releasing position to control the clamping jaws 22 to close inwardly or stretch outwardly. The clamping component 20 is accommodated in the accommodating space 54 of the shell sleeve 50, and the shell sleeve 50 and the clamping component 20 are capable of sliding relative to each other; since the connector portion 56 is connected to the closed end 522 of the sleeve body 52, when the shell sleeve 50 is displaced to the pressing position or the releasing position, the connector portion 56 and the sleeve body 52 move together. A leak-proof element (O-ring) 38 is installed in a ring groove 32 of the main body 30 and engages with the inner peripheral surface of the sleeve body 52 to keep the shell sleeve 50 and the clamping component 20 airtight. The releasing position and the pressing position are respectively a top stop point and a bottom stop point of a displacement stroke of the shell sleeve 50.

FIG. 5 shows that the shell sleeve 50 of the inflatable air nozzle connector 10 is located at the releasing position, and the snap portion 55 of the shell sleeve 50 snaps with the fasten portions 24 of the clamping jaws 22. At this time, the clamping jaws 22 are stretched outwardly and the airtight ring 40 is not compressed so that an air nozzle 60 of a tire can be inserted into the through hole 42 of the airtight ring 40.

Figure 6:
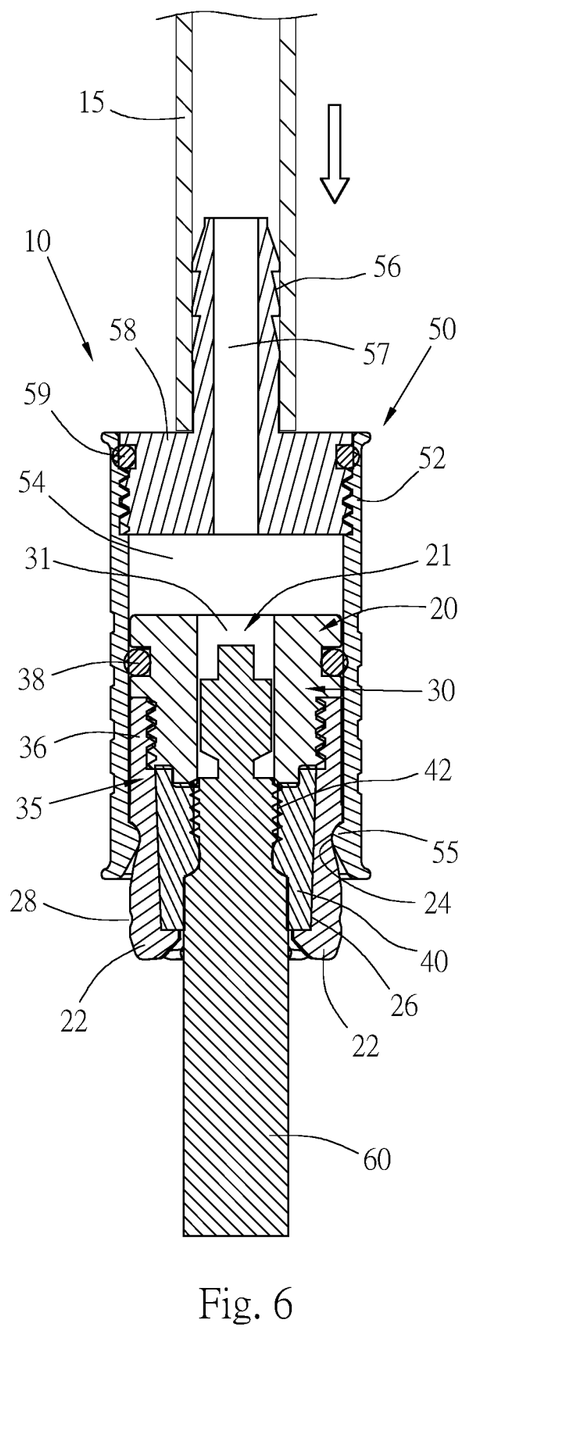
FIG. 6 and FIG. 7 show a state of using the inflatable air nozzle connector of the invention to inflate a tire.

Please refer to FIG. 6, the connector portion 56 of the inflatable air nozzle connector 10 is connected to an air tube 15 of an inflator (not shown in the figure). When a tire is to be inflated, as shown in FIG. 6, the shell sleeve 50 of the inflatable air nozzle connector 10 is in the releasing position, and a user uses a bottom end of the inflatable air nozzle connector 10 to sleeve on the air nozzle 60 of the tire, the air nozzle 60 is inserted into the air passage 21 and the through hole 42 of the airtight ring 40. Then, the user pushes the shell sleeve 50 downward, that is, moving toward the air nozzle 60, and displacing to the pressing position shown in FIG. 7. At this time, the shell sleeve 50 is located at a bottom stop point of its sliding stroke, the bottom end 521 of the sleeve body 52 presses the bottom sides (the diameter of the bottom sides of the clamping jaws 22 is larger) of the clamping jaws 22 of the clamping component 20, and the clamping jaws 22 close inwardly and compress the airtight ring 40 to cause the airtight ring 40 to deform and airtightly tighten the air nozzle 60 so that air in the air passage 21 cannot leak outside. Then, the inflator is activated to inject air into the air nozzle 60 of the tire from the air tube 15, the perforation 57 of the connector portion 56, and the air passage 21 to inflate the tire. In addition, when the shell sleeve 50 is located at the pressing position, the snap portion 55 of the sleeve body 52 snaps into a positioning portion 28 provided on the outer peripheral surface of each of the clamping jaws 22 for positioning. The positioning portion 28 forms a ring-shaped recess and is provided on the outer peripheral surfaces of the bottom sides of the clamping jaws 22.

After inflation is completed, hold the shell sleeve 50 or the air tube 15 with one hand, and pull the shell sleeve 50 upward, that is, moving the shell sleeve 50 in a direction away from the air nozzle 60 (also a direction away from the open end 521), so that the shell sleeve 50 is returned to the releasing position, the bottom end 521 of the shell sleeve 50 is displaced to the top side with the smaller diameter of the clamping jaws 22, and the clamping jaws 22 are free from being pressed. The clamping jaws 22 are then elastically stretched and the airtight ring 40 is no longer compressed, the airtight ring 40 is thus elastically restored, and the air nozzle 60 is no longer tightened, so that the inflatable air nozzle connector 10 can be separated from the air nozzle 60.

Figure 8:
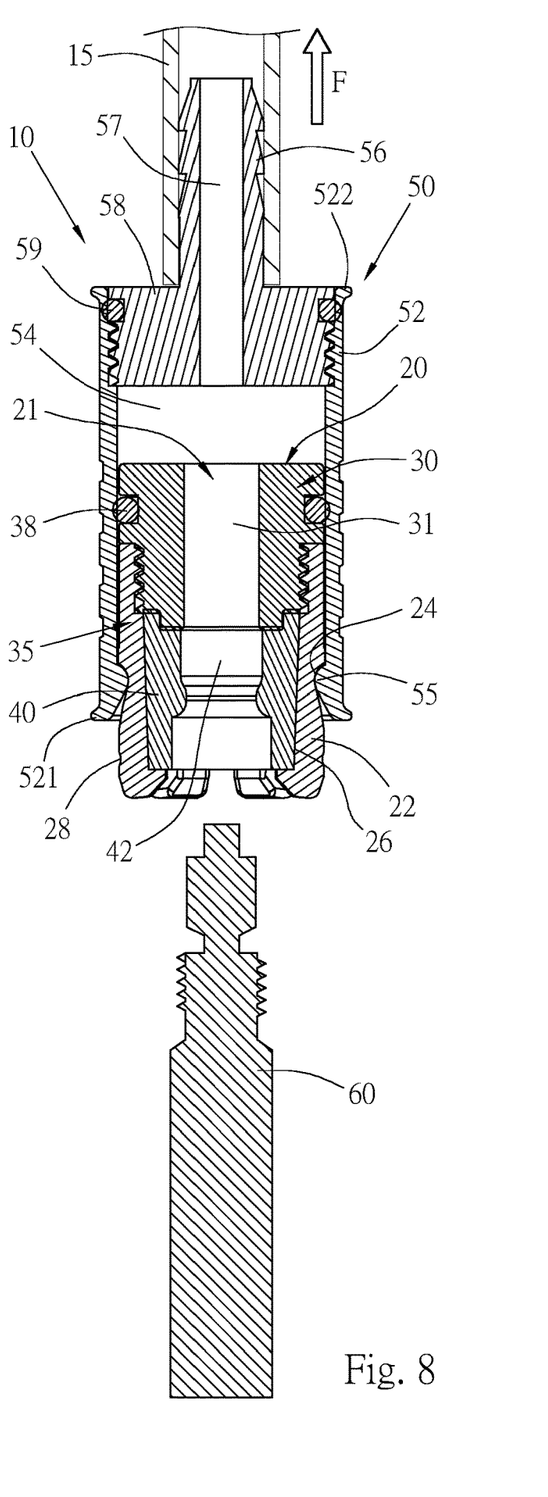
FIG. 8 shows an operating state of separating the inflatable air nozzle connector from an air nozzle of a tire after inflation is completed.
Figure 9:
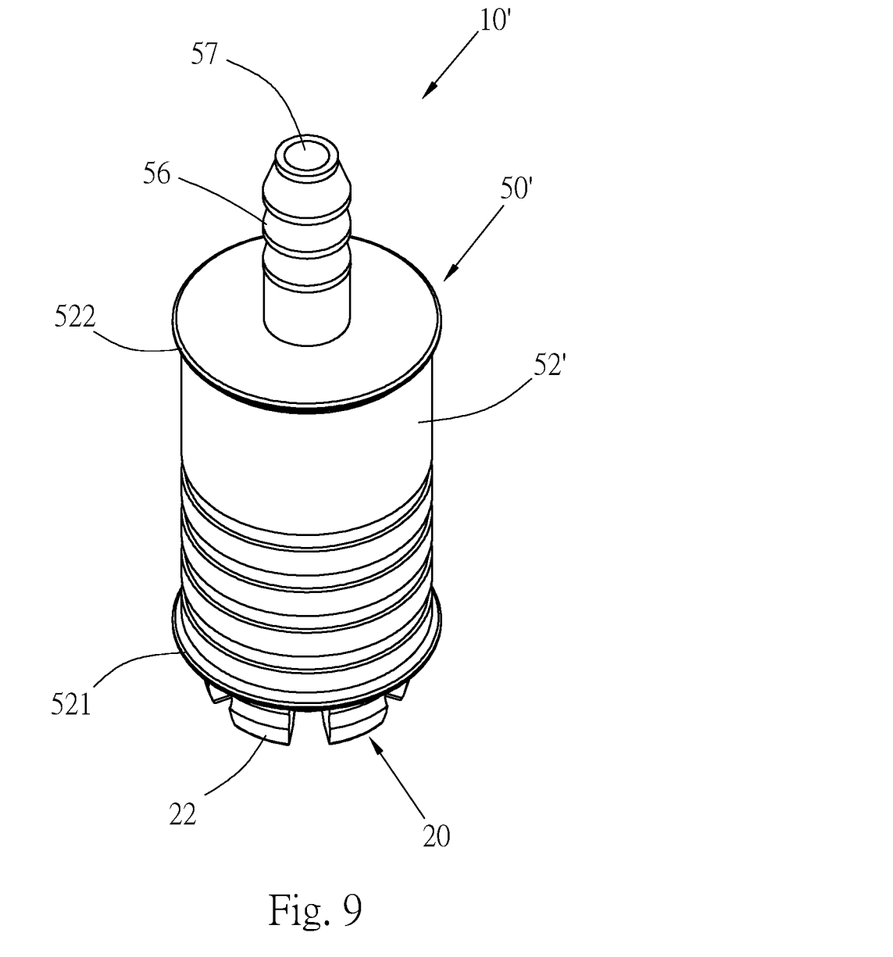
FIG. 9 is a top perspective view of the inflatable air nozzle connector of a second preferred embodiment of the invention.

In the releasing position, the snap portion 55 of the shell sleeve 50 snaps with the fasten portion 24 of the clamping component 20, and a snapping and engaging relationship between the snap portion 55 and the fasten portion 24 makes the shell sleeve 50 capable of driving the clamping component 20 to move together. Therefore, when the user pulls the shell sleeve 50 upward with a force F, as shown in FIG. 8, the clamping component 20 is driven to move upward together, so that the entire inflatable air nozzle connector 10 can be separated from the air nozzle 60. The user can pull or push the sleeve body 52 or the connector portion 56, which is convenient for manipulating the shell sleeve 50 with one hand.

It can be known from the above description that the user pushes the inflatable air nozzle connector 10 toward the air nozzle 60 with one hand, as shown in FIG. 7, so that the inflatable air nozzle connector 10 can be sleeved on the air nozzle 60 airtightly for inflation. After inflation is completed, the user pulls the inflatable air nozzle connector 10 in a direction away from the air nozzle 60 to separate the inflatable air nozzle connector 10 from the air nozzle 60, as shown in FIG. 8. Therefore, the design of the invention is convenient for the user to manipulate the inflatable air nozzle connector 10 with one hand to sleeve on the air nozzle 60 or separate from the air nozzle 60.

FIGS. 9 to 12 are an inflatable air nozzle connector 10' provided by a second preferred embodiment of the invention. The components that are the same as those in the first embodiment have the same reference numbers and thus will not be repeated.

The inflatable air nozzle connector 10' also comprises: a clamping component 20', an airtight ring 40, and a shell sleeve 50'. The clamping component 20' is installed in the accommodating space 54 of the shell sleeve 50'; and the airtight ring 40 is disposed in the chamber 26 of the clamping component 20'.

The shell sleeve 50' is formed by a sleeve body 52', and a top end of the sleeve body 52' is a closed end for disposing the connector portion 56 and the perforation 57.

Figure 10:
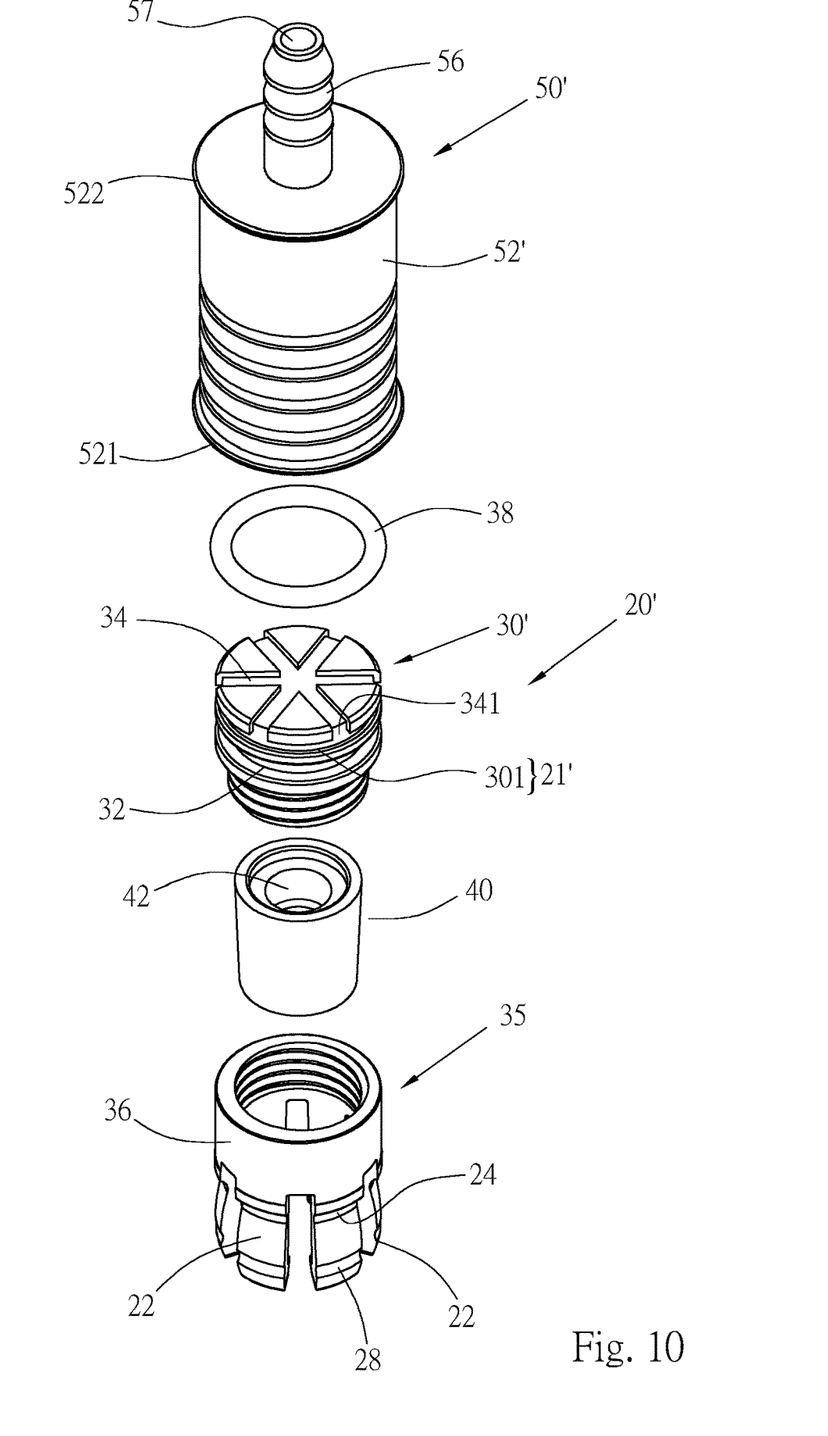
FIG. 10 is a top exploded perspective view of FIG. 9.
Figure 11:
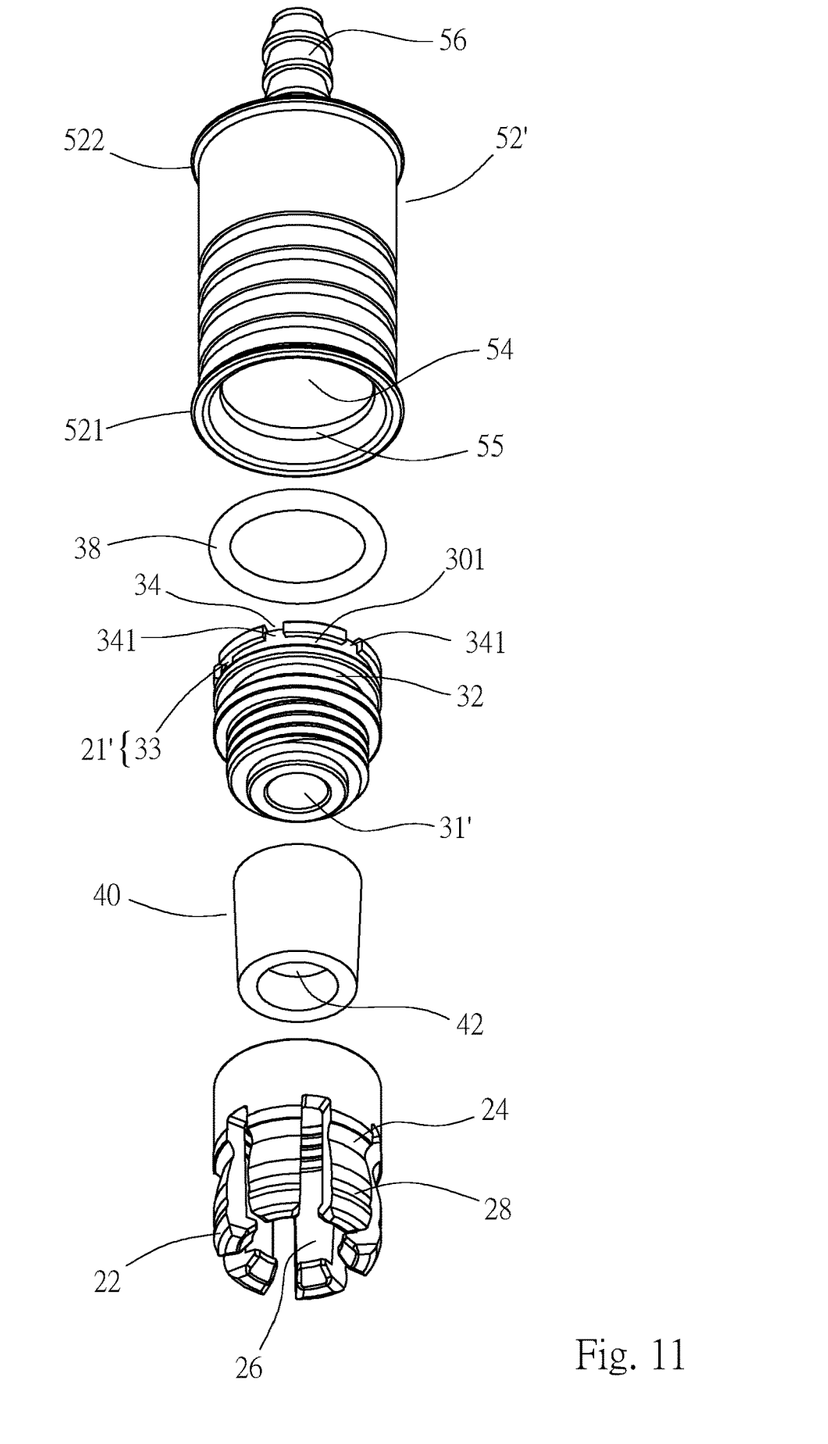
FIG. 11 is a bottom exploded perspective view of FIG. 9.
Figure 12:
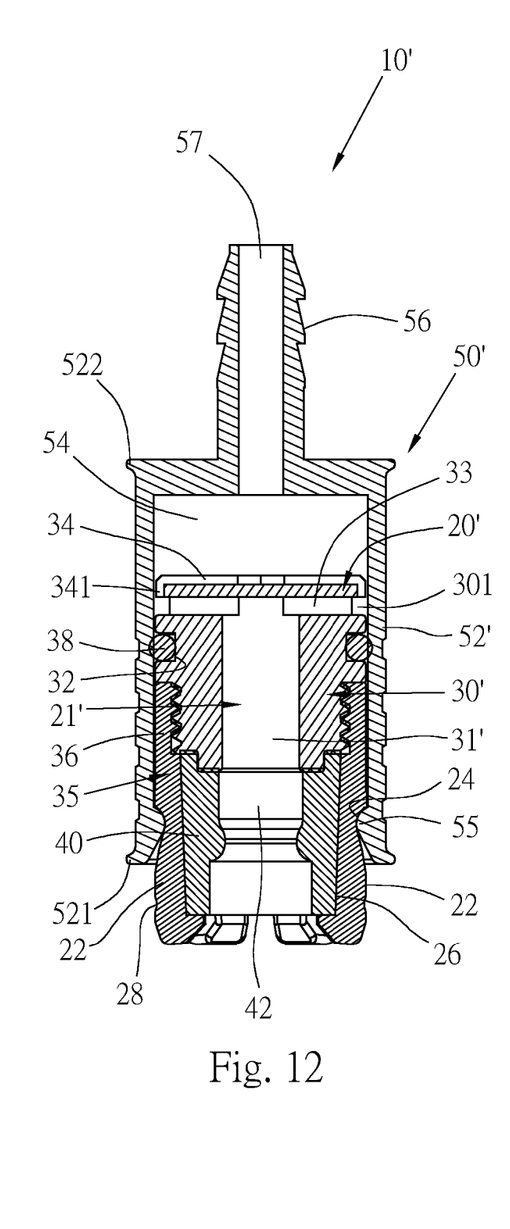
FIG. 12 is a cross-sectional view of the inflatable air nozzle connector of FIG. 9 in the top-bottom direction.

In this embodiment, the clamping component 20' is also formed by assembling a main body 30' with a connecting member 35, and a top end of the connecting member 35 is screwed to a bottom end of the main body 30', wherein, an air hole 31' inside the main body 30' passes through the bottom end of the main body 30', but does not pass through a top end of the main body 30'; at least one flow channel 33, as shown in FIG. 12, is radially provided in the main body 30' and communicates with the air hole 31', a position of the flow channel 33 is higher than that of the leak-proof element 38, and at least one end or two ends of the flow channel 33 passes through or pass through a peripheral surface of the main body 30', so that the flow channel 33 communicates with the accommodating space 54 of the shell sleeve 50' to allow air to flow between the accommodating space 54 and the flow channel 33. In addition, in this embodiment, an annular air groove 301 is further recessed on the peripheral surface of the main body 30' at a position corresponding to the flow channel 33, so that the end of the flow channel 33 communicates with the air groove 301. A plurality of guide grooves 34, such as the three guide grooves 34, are provided on a top end face of the main body 30' as shown in FIG. 10, and two ends of each of the guide grooves 34 communicate with the air groove 301 with a notch 341 respectively. The guide grooves 34 are located directly below the perforation 57 of the connector portion 56 to guide the air flowing in from the perforation 57. Preferably, the guide grooves 34 are radially provided on a top surface of the main body 30'.

FIG. 12 shows that the shell sleeve 50' of the inflatable air nozzle connector 10' is located at the releasing position, at this time, the snap portion 55 of the shell sleeve 50' snaps with the fasten portions 24 of the clamping jaws 22 of the clamping component 20', the clamping jaws 22 are stretched outwardly and the airtight ring 40 is not compressed so that the air nozzle 60 of a tire can be inserted into the through hole 42 of the airtight ring 40.

Figure 13:
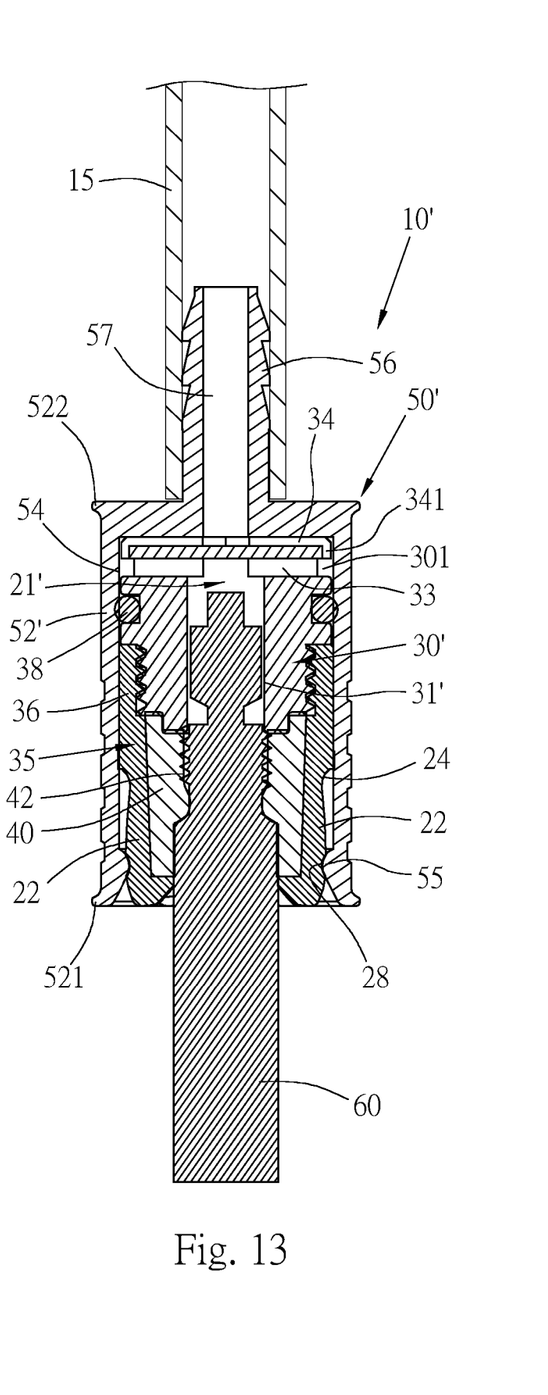
FIG. 13 is a state of using the inflatable air nozzle connector of FIG. 9 of the invention to inflate a tire.

FIG. 13 shows that the inflatable air nozzle connector 10' sleeves on the air nozzle 60 of a tire airtightly to inflate the tire. At this time, the shell sleeve 50' is pushed toward the air nozzle 60 and displaced to the pressing position. The bottom sides of the clamping jaws 22 are pressed by the bottom end 521 of the shell sleeve 50' to close inwardly, and compress the airtight ring 40 to deform the airtight ring 40 and to tighten the air nozzle 60 airtightly by the deformed airtight ring 40. After the inflator is activated, air flows into the accommodating space 54 from the air tube 15 and diffuses outwardly to flow toward the annular air groove 301 through guiding of the guide grooves 34 of the clamping component 20', and then flows into the air hole 31' of the main body 30' through the flow channel 33 and is injected into the air nozzle 60 to inflate the tire. The flow channel 33 and the air hole 31' constitute an air passage 21' of the clamping component 20', allowing the inflated air to flow into the tire. The guide grooves 34 and the notches 341 can also be regarded as parts of the air passage 21'.

After inflation is completed, as shown in an operation of FIG. 8, hold the shell sleeve 50' or the air tube 15 with one hand, and pull and move the shell sleeve 50' upward in a direction away from the air nozzle 60 (also a direction away from the open end 521) to move the shell sleeve 50' upward and return the shell sleeve 50' to the releasing position. At this time, the snap portion 55 of the shell sleeve 50' snaps with the fasten portion 24 of the clamping component 20', the bottom end 521 of the shell sleeve 50' no longer presses the clamping jaws 22, the clamping jaws 22 are then elastically stretched, and the airtight ring 40 is free from being compressed. The airtight ring 40 is thus elastically restored, and the air nozzle 60 is no longer tightened by the airtight ring 40. By means of a contact relationship and an abutting relationship between the snap portion 55 and the fasten portion 24, a force exerted by an operator by pulling the shell sleeve 50' upward and simultaneously pulling the clamping component 20' upward together is capable of easily separating the inflatable air nozzle connector 10' from the air nozzle 60.

The inflatable air nozzle connectors 10, 10' provided by the invention allow the user to operate single-handedly to be capable of sleeving the inflatable air nozzle connector on the tire air nozzle airtightly and separating the inflatable air nozzle connector from the tire air nozzle, making operation of inflating tire more convenient.

It is to be understood that the above description is only the embodiments of the invention and is not used to limit the present invention, and changes in accordance with the concepts of the present invention may be made without departing from the spirit of the present invention. For example, the equivalent effects produced by various transformations, variations, modifications and applications made to the configurations or arrangements shall still fall within the scope covered by the appended claims of the present invention.

What is claimed is:

1. An inflatable air nozzle connector capable of being operated single-handedly comprising:
    a clamping component having an air passage for air flowing through the clamping component; a plurality of clamping jaws being disposed around a bottom end of the clamping component, an annular chamber being formed between the clamping jaws and communicating with the air passage; the clamping jaws being capable of closing inwardly or stretching outwardly;
    a soft airtight ring installed in the chamber of the clamping component, and having a through hole communicating with the air passage; and
    a shell sleeve having a hollow sleeve body, a bottom end of the sleeve body being an open end, and a top end of the sleeve body being a closed end; an accommodating space being formed in the sleeve body; a connector portion having a perforation, the connector portion being disposed on the closed end of the sleeve body, the perforation communicating with the accommodating space of the shell sleeve;
    the sleeve body of the shell sleeve being capable of slidably sleeving on an outer periphery of the clamping component and capable of displacing downward to a pressing position and displacing upward to a releasing position, when the shell sleeve displacing, the sleeve body and the connector portion moving together; when the shell sleeve being located at the pressing position, the clamping jaws of the clamping component being pressed to close inwardly, so that the clamping jaws compressing the airtight ring; when the shell sleeve being located at the releasing position, the clamping jaws being not pressed, and the clamping jaws stretching outwardly;
    wherein a main body of the clamping component is provided with an air hole passing through a bottom end of the main body; at least one flow channel is radially provided in the main body and communicates with the air hole, at least one end of the flow channel passes through a peripheral surface of the main body and communicates with the accommodating space; the air hole and the at least one flow channel form the air passage;
    wherein the peripheral surface of the main body is recessed with an annular air groove; at least one end of the flow channel communicates with the air groove.

2. The inflatable air nozzle connector as claimed in claim 1, wherein an inner peripheral surface of the sleeve body is provided with a snap portion; an outer peripheral surface of the clamping component is provided with a fasten portion, when the shell sleeve is located at the releasing position, the snap portion contacts the fasten portion, when the shell sleeve moves in a direction away from the open end, the clamping component is driven to move together.

3. The inflatable air nozzle connector as claimed in claim 2, wherein the air passage passes through a top end and the bottom end of the clamping component.

4. The inflatable air nozzle connector as claimed in claim 2, wherein the peripheral surface of the main body is recessed with an annular air groove; at least one end of the flow channel communicates with the air groove.

5. The inflatable air nozzle connector as claimed in claim 4, further comprising at least one guide groove provided on a top surface of the main body along a radial direction of the main body, and at least one end of the at least one guide groove communicating with the air groove.

6. The inflatable air nozzle connector as claimed in claim 2, wherein the shell sleeve is composed of the sleeve body and an end member, the end member is disposed at one end of the sleeve body to form the closed end; and the connector portion and the perforation are disposed on the end member.

7. The inflatable air nozzle connector as claimed in claim 2, wherein the clamping component has a main body and a connecting member, a top end of the connecting member is connected to the main body; the air passage is disposed in the main body; and the clamping jaws are disposed around a bottom end of the connecting member.

8. The inflatable air nozzle connector as claimed in claim 2, wherein the inner peripheral surface of the sleeve body is provided with a snap portion; the outer peripheral surface of a bottom side of the clamping component is provided with a positioning portion, and when the shell sleeve is located at the pressing position, the snap portion contacts the positioning portion.

9. The inflatable air nozzle connector as claimed in claim 1, wherein the air passage passes through a top end and the bottom end of the clamping component.

10. The inflatable air nozzle connector as claimed in claim 1, further comprising at least one guide groove provided on a top surface of the main body along a radial direction of the main body, and at least one end of the at least one guide groove communicating with the air groove.

11. The inflatable air nozzle connector as claimed in claim 1, wherein the shell sleeve is composed of the sleeve body and an end member, the end member is disposed at one end of the sleeve body to form the closed end; and the connector portion and the perforation are disposed on the end member.

12. The inflatable air nozzle connector as claimed in claim 1, wherein the clamping component has a main body and a connecting member, a top end of the connecting member is connected to the main body; the air passage is disposed in the main body; and the clamping jaws are disposed around a bottom end of the connecting member.

13. The inflatable air nozzle connector as claimed in claim 1, wherein the inner peripheral surface of the sleeve body is provided with a snap portion; the outer peripheral surface of a bottom side of the clamping component is provided with a positioning portion, and when the shell sleeve is located at the pressing position, the snap portion contacts the positioning portion.

\* \* \* \* \*